United States Patent [19]

Houle

[11] 4,320,082
[45] Mar. 16, 1982

[54] MOLDING OF ROTARY MOWER SAFETY BLADE

[76] Inventor: Elmer R. Houle, 2221 N. 40th St., Phoenix, Ariz. 85008

[21] Appl. No.: 66,090

[22] Filed: Aug. 13, 1979

Related U.S. Application Data

[60] Continuation-in-part of Ser. No. 894,495, Apr. 7, 1978, abandoned, which is a division of Ser. No. 832,201, Sep. 12, 1977, abandoned.

[51] Int. Cl.³ .............................................. B29C 6/02
[52] U.S. Cl. ............................ 264/257; 264/DIG. 69
[58] Field of Search ........ 264/36, DIG. 42, DIG. 69, 264/257, 236, 37, 258

[56] References Cited

U.S. PATENT DOCUMENTS

| | | | |
|---|---|---|---|
| 1,381,654 | 6/1921 | Muschewske et al. | 264/DIG. 69 |
| 2,164,400 | 7/1939 | Groskopf . | |
| 3,271,039 | 9/1966 | Kohl et al. | 264/257 |
| 3,468,974 | 9/1969 | Elgin . | |
| 3,607,600 | 9/1971 | Schreter | 264/257 |
| 3,614,861 | 10/1971 | Wickham et al. . | |
| 3,911,652 | 10/1975 | Houle | 56/295 |
| 4,052,344 | 10/1977 | Crane et al. . | |
| 4,139,591 | 2/1979 | Jurisich | 264/257 |
| 4,197,381 | 4/1980 | Alia | 264/236 |

FOREIGN PATENT DOCUMENTS

| | | | |
|---|---|---|---|
| 747219 | 8/1970 | Belgium | 264/DIG. 69 |
| 83456 | 5/1970 | Fed. Rep. of Germany . | |
| 54-21388 | 7/1979 | Japan | 264/257 |
| 906321 | 11/1959 | United Kingdom | 264/257 |

*Primary Examiner*—James B. Lowe
*Attorney, Agent, or Firm*—Don J. Flickinger

[57] ABSTRACT

A safety blade for a powered rotary lawn mower and method of making same. A layer of high strength fabric of an organic polymer extends throughout the blade. A metallic bar is positioned primarily in the central portion of the blade. The fabric and bar are bonded together and encapsulated in a elastomeric material containing fibers of an organic polymer. The blade is formed so that the outer end portions are provided with cutting edges with the fabric intersecting the cutting edges.

10 Claims, 6 Drawing Figures

MOLDING OF ROTARY MOWER SAFETY BLADE

CROSS REFERENCE TO RELATED APPLICATIONS

This application is a continuation-in-part of Ser. No. 894,495 filed Apr. 7, 1978, and now abandoned, which in turn is a division of Ser. No. 832,201, filed Sept. 12, 1977, and now abandoned.

BACKGROUND OF THE INVENTION (1) Field of the Invention

The present invention relates to mower safety blades and the method of making them, and is concerned primarily with a blade having a layer of high strength fabric in a homogeneous body of elastomeric material and plastic fibers. The blade has a centrally positioned metallic bar encased in the elastomeric material which bar does not extend to the ends of the blade. The outer portions of each blade has a cutting edge which intersects the fabric.

(2) Description of the Prior Art

In the U.S. Pat. No. 3,911,652, dated Oct. 14, 1975, there is disclosed a safety blade for rotary lawn mowers. U.S. Pat. No. 3,911,652 is believed to be the most relevant prior art. This patent discloses a blade having a central section and end portions. A pair of metallic bars are included in the central section and a body of rubber-like bonding material and layers of fabric are bonded about the metallic bars and extend through the end portions. Each of the end portions is formed with a cutting edge.

Safety mower blades must have the ability to resist elongation because of the high rpms at which they are used which is normally around 3600 rpm. The blades must have a long useful life comparable to that of a metallic rotary blade which means they must resist wear. The blade must also resist forces applied to it when cutting grass, for example, which tend to deflect the blade from its normal plane of rotation so that it will cut grass evenly. Since they are generally powered by gasoline motors, the temperature in the immediate vicinity of the blades can easily reach 150° F. so that the materials used must not be adversely affected by such temperatures.

The safety blade of U.S. Pat. No. 3,911,652 solves the above identified problems by using multiple layers of fabric, four in the end portion, two in the central portion, plus two layers of metal, all of which are encased in a body of vulcanized rubber.

SUMMARY OF THE INVENTION

The present invention provides a safety blade for a powered rotary mower. A layer of fabric made of high tensile strength threads extends substantially the entire length and breadth of the blade. A metallic bar, or plate, is also incorporated into the blade. A strong, resilient elastomeric material such as rubber encases, or encapsulates, the bar and the layer of fabric. The elastomeric material which can be reclaimed rubber from tires for example includes, or contains, fibers of an organic polymer such as nylon. The blade is formed so that the outer portions of the blade each has a cutting edge and the fabric is positioned in the blade so that it intersects the cutting edge.

The above-described safety mower blade can be formed by the steps of first cutting and grinding reclaimed rubber or waste rubber into a finely comminuted state and then cleaning this rubber. A hydrocarbon solvent agent is then added to the comminuted rubber. At this stage in the process, cut plastic fibers of an organic polymer such as a polyamide are added and the mixture agitated to achieve a thorough intermixture of the ingredients. The next step is to add a vulcanizing agent such as sulphur and magnesium oxide and carbon black. A plasticizer is then added. While castor oil and glycerin are satisfactory, used motor oil is considered the preferred plasticizer. At this stage in the process, a reaction accelerator such as zinc and stearic acid is added. While it is not absolutely essential, a stabilizer agent such as ethylene thiourea is added. A layer of the mixture is then placed in the mold, then the layer of fabric is placed over the thin layer of the mixture. Another layer of the material is placed on top of the fabric and then the rigid metallic bar is placed in the mold. After the bar is placed in the mold the rest of the volume of the mold is filled with the material. The contents of the mold are heated under pressure to vulcanize the bar and the layer of fabric to bond them together and to form the end portions with the cutting edges and lifts. The layer of fabric is positioned so that it intersects, or forms the cutting edges of the end portions of the blade.

This invention provides an improved safety mower blade which equals or betters the performance of the prior art blades of the same type and which requires only a single layer of high tensile strength organic fabric compared with the prior art blades need for from two to four such layers. The fibers uniformly distributed and randomly oriented in the elastomeric material provide the equivalent in resistance to elongation at operational rpms, wear resistance and resistance to deflection which is the equivalent or better than the prior art safety blades using a plurality of layers of fabric. The reduction in the amount of fabric used per blade plus the ability to use reclaimed rubber from tires as the elastomeric material makes it possible to reduce the cost to manufacture safety blades of the present invention so that they are more cost competitive with conventional all metallic blades. Positioning the fabric so that it intersects the cutting edges of the blades, or forms them, causes the blades to be self-sharpening since the material of the fabric, nylon in the preferred embodiment, resists abrasion significantly better than the preferred elastomeric material, rubber plus nylon fiber, without detracting from the safety of use of the blade.

With the foregoing in mind, the present invention has the following objectives:

1. To provide a safety blade for a rotary lawn mower which includes a rubber-like body which is susceptible of long service life and has cutting edges of improved quality.

2. To provide in a safety blade of the type noted a homogeneous body comprising finely ground and comminuted waste rubber together with cut plastic fibers.

3. To provide a safety mower blade of the character aforesaid comprising a central section and two end sections with the body being molded and vulcanized about a rigid metallic bar and a layer of high tensile strength organic fabric with the end sections extending beyond the ends of the bar and consisting only of the homogeneous body and the layer of fabric.

4. To provide in a rotary safety blade of the kind described end portions which have a cutting edge on one side and a lift on the opposite side.

5. To provide in a rotary safety blade of the type noted a central section which is formed with means for connecting it to the vertical drive shaft of a rotary mower.

6. To provide a method of making a safety mower blade which fulfills the above objectives.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DETAILED DESCRIPTION

Figure 1:
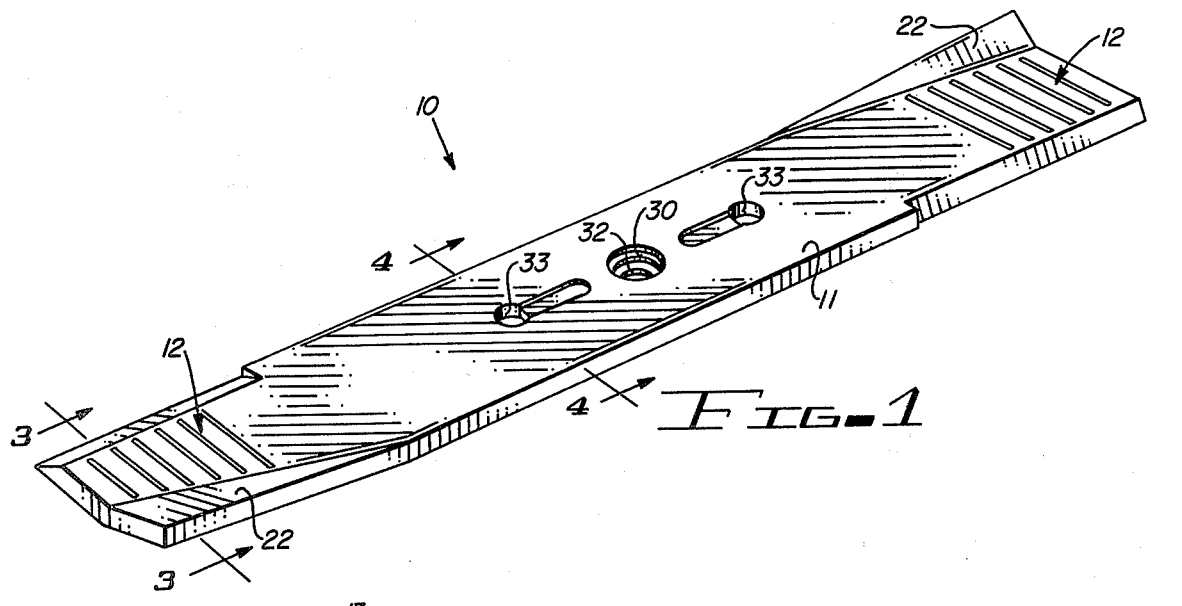
FIG. 1 is a perspective of a safety blade for rotary lawn mower made in accordance with the precepts of this invention.

Referring now to the drawing, wherein like reference characters denote corresponding elements throughout the several views, and first more particularly to FIGS. 1-5, inclusive, the safety mower blade of this invention will be described.

Figure 2:
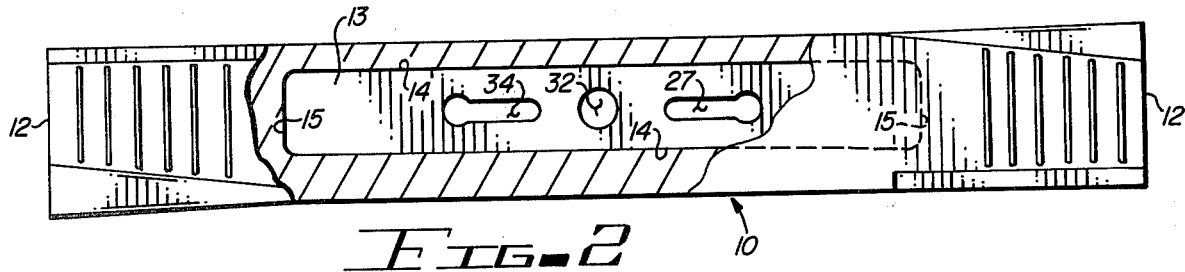
FIG. 2 is a top plan view of the blade with the body of the central section broken away from the metallic bar.
Figure 3:
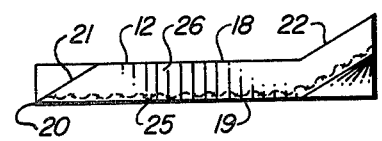
FIG. 3 is a detail cross-section through the blade about on the plane represented by the line 3—3 of FIG. 1.
Figure 4:
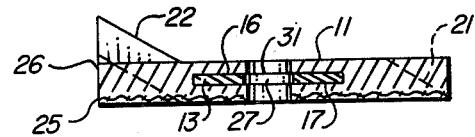
FIG. 4 is a detail cross-section through the blade taken about on the plane represented by the line 4—4 of FIG. 1.

The blade is designated in its entirelty at 10. It comprises a central section 11 and end portions 12. Central section 11 includes a rigid metallic bar 13 with steel being a good example of the material from which bar 13 is made. Bar 13 is of elongated rectangular shape, presenting side edges 14, end edges 15, an upper face 16, and a lower face 17. As shown in FIG. 2, side edges 14 are spaced inwardly from side edges of the blade, and as depicted in FIG. 4, upper face 16 is spaced from the upper surface of the blade and lower face 17 is spaced from the bottom surface of the blade. As is more clearly brought out in FIG. 2, end portions 12 extend beyond the ends 15 of bar 13. As illustrated in FIG. 3, each end portion 12 has an upper face 18 and a lower face 19. A cutting edge 20 is formed by an inclined surface 21 intersecting bottom face 19. A lift 22 extends at an angle upwardly from the surfaces 18 and 19 on the side of end portions 12 opposite cutting edge 20.

A layer of heavy duty fabric 25 made of a high strength abrasive resistent organic polymer such as nylon is positioned in blade 10. The dimensions, length and width of the layer of fabric 25 are substantially the same as that of blade 10, or the area of fabric 25 substantially equals that of blade 10 as seen in FIG. 2. Fabric 25 is spaced from the lower face 19 of end portion 12 by a thin layer of the elastomeric 26 forming the balance of blade 10. Referring to FIG. 4, it can be seen that fabric 25 is also spaced below bar 13 by a thin layer of material 26. Fabric 25 is positioned in blade 10 such that it substantially intersects, or forms, cutting edges 20 in end portions 12. In a preferred embodiment, fabric 25 is made of nylon threads substantially 0.035 inches in diameter with the fabric having a woof of from 23 to 25 such threads per inch and the warp from 10 to 15 such threads. Such a fabric is sold by the B. F. Goodrich Industrial Products Company and is identified as G.R. 953 Nylon Fabric.

While material 26 can be made of any suitable elastomeric material having properties substantially the same as rubber, the preferred embodiment uses rubber, such as reclaimed rubber from vehicle tire carcasses. The finely ground waste rubber after removal of substantially all metal such as bead wires and of as much fibrous cord elements or fibers as is conveniently accomplishable with the state of the art processes is intermixed with additional fibers of an organic polymer such as nylon so that the total amount of fiber to rubber is in the range of from 45 to 60% weight of the two materials.

When rubber reclaimed from tire carcasses is used in forming material 26 even after as much of the fiber content of the tire carcass is removed under conventional processes, the amount of fiber remains is approximately 40% by weight. The additional amount of fiber to increase the content to the desired range of values can be obtained from the fiber removed in the process of devulcanizing or reclaiming the waste rubber. The maximum length of the fiber used is approximately ½ inch. It is substantially uniformly distributed throughout material 26 and is randomly oriented. The plastic fibers in material 26 improve the tensile strength of the material which property reduces elongation and hardens and stiffens material 26 to where it resists being deflected when in use. The fibers in material 26 also seem to increase the life of the cutting edges 20 to provide a longer service life for the blade.

Figure 5:
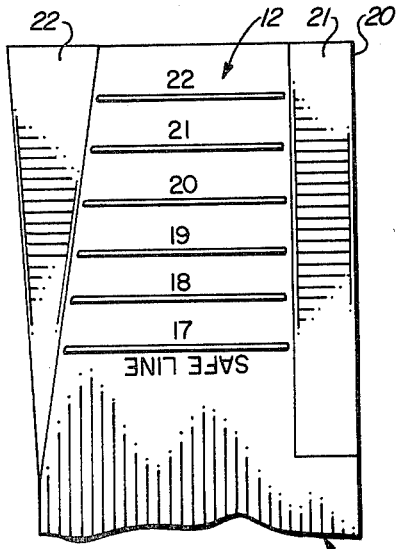
FIG. 5 is a detail top plan of one end portion of the blade.
Figure 6:
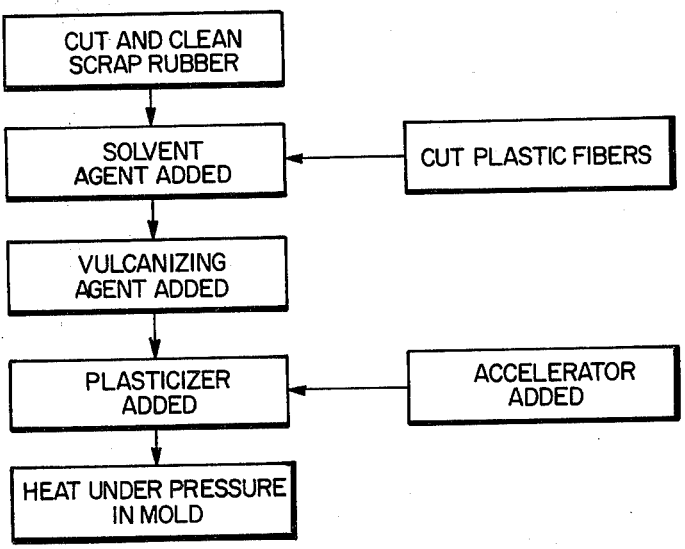
FIG. 6 is a flow chart which diagrammatically illustrates the method.

As shown more clearly in FIGS. 1, 2 and 5, each end portion 12 is formed with indicia in the form of cross lines on the end portion. These cross lines are marked to indicate the particular length of a blade required for a specific mower. The blade is manufactured in standard maximum lengths and portions may be cut off along one of these cross lines to adapt the blade to a mower of a particular size.

As illustrated in FIG. 1, blade 10 is provided with a stepped circular recess 30 which terminates in a membrane 31 which overlies a circular aperture 32 formed in bar 13. Each of the upper and lower faces of the body is also formed with a pair of keyhole-shaped recesses 33, the bottoms of which take the form of webs between the upper and lower surfaces of bar 13 and which are located at keyhole slots 34 in bar 13. The stepped recesses 30, aperture 32 and keyhole-shaped recesses 33 constitute means for drivably mounting the blade 10 on the vertical shaft of a rotary lawn mower.

The Method

A conventional hydrocarbon solvent is added to clean rubber in the proportion of 2 parts solvent to 1 part rubber in the tumbling drum. The mixture is agitated in similar fashion for 30-35 minutes and the solvent is removed. At this point, organic polymer fibers of the polyamide family, of which nylon is an example, is added to bring the proportion of fiber to from 45 to 60% by weight of the rubber fiber mixture. The rubber and the cut plastic fibers are then agitated for an additional 30 minutes. The solvent acts to open the pores of the rubber particles, thus increasing the reacting surface of the rubber mass and its ability to react to chemical additives.

A vulcanizing agent such as sulphur or magnesium oxide and carbon black are then added to the mixture. The carbon black also increases the ultimate strength of the finished product by promoting molecular cross-linking. Approximately 10–25% carbon black by weight is added.

A plasticizer is also added to the mixture to soften the rubber and permit successful molding. Although castor oil, glycerin and the like may be used as conventionally known, other petroleum-based agents may be employed. A unique feature of the present invention is the use as a plasticizer of used motor oil in the amount of 3% to 10%.

At least one accelerating agent is also added to the mixture. The accelerator acts to increase the heat due to the chemical reaction during the molding process, thus hastening the overall reaction and re-vulcanization. Generally speaking, a plurality of accelerating agents may be added, each active within a separate temperature range. Thus, the re-vulcanization process is hastened while the material is heating in the mold as well as when the material attains a steady state vulcanization temperature. Stearic acid in the amount of 1%–5% by weight is added to accelerate the reaction at low temperatures. Zinc oxide in the amount of 2%–5% by weight acts to accelerate the reaction when the mass reaches a higher temperature range.

A stabilizer may also be added to the mixture. Ethylene thiourea in the amount of 1%–3% by weight is used for stabilizing purposes. As the addition of the stabilizer is a somewhat optional step, the final step of the process is to place a thin layer of material 26 in the mold, place the piece of fabric on this layer, add a second layer of material 26, position bar 13 and fill the mold with material 26. The material in the mold is then subjected to heat under pressure to form blade 10. This final step may be taken either after the stabilizer is added, or if that step is omitted, after the addition of the plasticizer and accelerator.

While a preferred specific embodiment of the invention is hereinbefore set forth, it is to be clearly understood that the invention is not to be limited to the exact construction materials and steps illustrated and described because various modifications of these details may be provided in putting the invention into practice.

What is claimed:

1. The method of manufacture of a safety blade for rotary mowers, said blade have a central section and end portions, the end portions each having a cutting edge, said method comprising the steps of:
    mixing comminuted elastomeric material with fibers of an organic polymer with the fibers constituting from 45–60% by weight of the mixture of comminuted elastomeric material and fiber so that the fibers are substantially uniformly distributed and randomly oriented throughout the mixture and a solvent;
    adding a vulcanizing agent to the mixture;
    adding a plasticizer and reaction accelerator to the mixture and mixing them together;
    placing a first layer of the mixture into the mold;
    placing a layer of a fabric made of high tensile strength organic material over the first layer;
    placing a second layer of the mixture over the layer of fabric;
    placing a metal bar in the mold so that the bar will be symmetrically disposed with respect to the central section of the blade;
    filling the mold with the mixture; and
    applying heat and pressure to the contents of the mold to form a blade, the fabric being positioned in the blade so that it substantially intersects the cutting edges of the blade.
2. The method of claim 1 in which the elastomeric material is a rubber.
3. The method of claim 2 in which the organic polymer of the fibers is a nylon.
4. The method of claim 3 in which the fabric is made of threads of nylon.
5. The method of claim 4 in which the solvent is a hydrocarbon.
6. The method of claim 5 in which the maximum length of the fibers is substantially one-half inch.
7. The method of claim 6 in which the vulcanizing agent is sulphur, magnesium oxide and carbon black.
8. The method of claim 7 in which the plasticizer is used motor oil in a proportion of 3%–10% by weight of the total mixture.
9. The method of claim 8 in which the reaction accelerator comprises zinc in a proportion ranging from 2%–5% of the total mixture and stearic acid in a proportion ranging from 1%–5% of the total mixture.
10. The method of claim 9 in which the stabilizer is ethylene thiourea in a proportion ranging from 1%–3% of the total mixture.

* * * * *